US011080885B2

(12) United States Patent
Weller et al.

(10) Patent No.: US 11,080,885 B2
(45) Date of Patent: *Aug. 3, 2021

(54) DIGITALLY ENCODED MARKER-BASED AUGMENTED REALITY (AR)

(71) Applicant: LIMITLESS COMPUTING, INC., Boulder, CO (US)

(72) Inventors: Errin T. Weller, Louisville, CO (US); Jeffrey B. Franklin, Louisville, CO (US)

(73) Assignee: LIMITLESS COMPUTING, INC., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,737

(22) Filed: Nov. 18, 2019

(65) Prior Publication Data

US 2020/0082563 A1    Mar. 12, 2020

Related U.S. Application Data

(63) Continuation of application No. 16/262,526, filed on Jan. 30, 2019, now Pat. No. 10,489,930, which is a continuation of application No. 13/487,513, filed on Jun. 4, 2012, now Pat. No. 10,242,456.

(60) Provisional application No. 61/609,441, filed on Mar. 12, 2012, provisional application No. 61/534,165, filed on Sep. 13, 2011, provisional application No. 61/500,559, filed on Jun. 23, 2011.

(51) Int. Cl.
*G06T 7/73* (2017.01)
*G06T 19/00* (2011.01)
*G06T 17/05* (2011.01)

(52) U.S. Cl.
CPC .............. *G06T 7/73* (2017.01); *G06T 17/05* (2013.01); *G06T 19/006* (2013.01); *G06T 2207/30204* (2013.01)

(58) Field of Classification Search
CPC ......... G06T 7/73; G06T 17/05; G06T 19/006; G06T 2207/30204
See application file for complete search history.

(56) References Cited

U.S. PATENT DOCUMENTS

| 4,096,992 A | 6/1978 | Nojiri et al. |
| 5,428,212 A | 6/1995 | Tani et al. |
| 5,554,841 A | 9/1996 | Kost et al. |

(Continued)

*Primary Examiner* — Motilewa Good Johnson
(74) *Attorney, Agent, or Firm* — Snell & Wilmer L.L.P.; Kent A. Lembke

(57) ABSTRACT

A system and method for markers with digitally encoded geographic coordinate information for use in an augmented reality (AR) system. The method provides accurate location information for registration of digital data and real world images within an AR system. The method includes automatically matching digital data within an AR system by utilizing a digitally encoded marker (DEM) containing world coordinate information system and mathematical offset of digital data and a viewing device. The method further includes encoding geographic coordinate information into markers (e.g., DEMs) and decoding the coordinate information into an AR system. Through use of the method and corresponding system, marker technology and the basis of geo-location technology can be combined into a geo-located marker, thereby solving the problem of providing accurate registration within an augmented reality.

20 Claims, 11 Drawing Sheets

(56) References Cited

U.S. PATENT DOCUMENTS

| | | |
|---|---|---|
| 6,330,356 B1 | 12/2001 | Sundareswaran et al. |
| 6,937,255 B2 | 8/2005 | Fukada et al. |
| 7,127,082 B2 | 10/2006 | Neely |
| 7,274,380 B2 | 9/2007 | Navab et al. |
| 7,295,220 B2 | 11/2007 | Zhou et al. |
| 7,343,278 B2 | 3/2008 | Billinghurst et al. |
| 7,398,930 B2 | 7/2008 | Longacre, Jr. |
| 7,529,387 B2 | 5/2009 | Kotake et al. |
| 7,671,875 B2 * | 3/2010 | Anabuki ............... G06T 7/73 345/633 |
| 7,719,563 B2 | 5/2010 | Richards |
| 7,809,194 B2 | 5/2010 | Zhang et al. |
| 7,769,236 B2 | 8/2010 | Fiala |
| 7,840,340 B2 | 11/2010 | Graham et al. |
| 7,850,067 B1 | 12/2010 | Persson et al. |
| 7,886,978 B2 | 2/2011 | Ofek et al. |
| 8,019,148 B2 | 9/2011 | Morita et al. |
| 8,226,011 B2 | 7/2012 | Merkli et al. |
| 8,384,770 B2 | 2/2013 | Konno et al. |
| 8,542,906 B1 | 9/2013 | Persson et al. |
| 8,731,332 B2 | 5/2014 | Osako |
| 8,823,697 B2 | 9/2014 | Woo et al. |
| 8,854,356 B2 | 10/2014 | Oyagi et al. |
| 8,922,588 B2 | 12/2014 | Makino et al. |
| 9,013,505 B1 | 4/2015 | Thornton |
| 9,058,764 B1 | 6/2015 | Persson et al. |
| 9,278,281 B2 | 3/2016 | Ito et al. |
| 10,242,456 B2 * | 3/2019 | Weller ............... G06T 7/73 |
| 10,489,930 B2 * | 11/2019 | Weller ............... G06T 7/73 |
| 2001/0038718 A1 | 11/2001 | Kumar et al. |
| 2002/0052709 A1 | 5/2002 | Akatsuka et al. |
| 2003/0076980 A1 | 4/2003 | Zhang et al. |
| 2003/0080978 A1 | 5/2003 | Navab et al. |
| 2004/0046779 A1 | 3/2004 | Asano et al. |
| 2006/0013436 A1 | 1/2006 | Takahashi et al. |
| 2006/0038833 A1 | 2/2006 | Mallinson et al. |
| 2007/0038944 A1 | 2/2007 | Carignano et al. |
| 2007/0098234 A1 | 5/2007 | Fiala |
| 2007/0143082 A1 | 6/2007 | Degnan |
| 2007/0273644 A1 | 11/2007 | Mondine Natucci |
| 2008/0147325 A1 | 6/2008 | Maassel et al. |
| 2008/0266323 A1 | 10/2008 | Biocca et al. |
| 2009/0030544 A1 | 1/2009 | Floeder et al. |
| 2009/0245681 A1 * | 10/2009 | Kobayashi ............... G06T 7/74 382/275 |
| 2010/0033484 A1 | 2/2010 | Kim et al. |
| 2010/0057586 A1 | 3/2010 | Chow |
| 2010/0171758 A1 | 3/2010 | Maassel et al. |
| 2010/0092079 A1 | 4/2010 | Aller |
| 2010/0230328 A1 | 9/2010 | Bonnell et al. |
| 2011/0134108 A1 | 6/2011 | Hertenstein |
| 2011/0169861 A1 * | 7/2011 | Suzuki ............... G06T 19/006 345/632 |
| 2011/0310087 A1 | 12/2011 | Wright, Jr. et al. |
| 2012/0218299 A1 * | 8/2012 | Hayakawa ............... A63F 13/06 345/633 |
| 2012/0218300 A1 * | 8/2012 | Hayakawa ............... A63F 13/5255 345/633 |
| 2012/0268491 A1 * | 10/2012 | Sugden ............... G06T 7/80 345/633 |
| 2013/0141461 A1 | 6/2013 | Salter et al. |

* cited by examiner

DIGITALLY ENCODED MARKER-BASED AUGMENTED REALITY (AR)

CROSS-REFERENCE TO RELATED APPLICATIONS

This application is a continuation of U.S. patent application Ser. No. 16/262,526, filed Jan. 30, 2019, which is a continuation of U.S. patent application Ser. No. 13/487,513, filed Jun. 4, 2012, which claims the benefit of U.S. Provisional Application No. 61/500,559, filed Jun. 23, 2011, U.S. Provisional Application No. 61/534,165, filed Sep. 13, 2011, and U.S. Provisional Application No. 61/609,441, filed Mar. 12, 2012, which are all incorporated herein by reference in their entireties.

FIELD OF THE INVENTION

Generally, the present disclosure relates to the field of augmented reality or simply AR. More particularly, the described methods and systems relate to increasing geographic accuracy of an AR system using markers.

BACKGROUND

Computers and mobile devices (e.g., smart phones, tablet computers, handheld computers, and the like) are increasingly often equipped with input devices such as cameras that display and/or record streaming video of the physical world surrounding the operator and the device. The video images or streaming video may be thought of as representations of the "real world" or "reality." The technology of augmented reality (AR) combines elements of such representations of the physical world with digital or virtual objects. The final augmented vision or display gives the appearance to the user that the digital object exists or is present in the real world or surrounding physical environment.

For AR to be enjoyable, the user experience should be seamless. For example, a preferred AR experience may include having the virtual object presented in a display screen or on a monitor so as to appear to be correctly positioned within the real or physical world, and the AR experience may then include enabling user interaction with the correctly positioned object on their computer or mobile device (also called a "viewing device" herein). Furthermore, the AR graphics should adjust in real time in response to changes in the user's real world position or movement of the viewing device (or its camera). This requires accurate registrations of the user's viewing device and the digital data providing the streaming video of the physical world and also providing the virtual or AR object.

Accurate registration of world coordinates to AR coordinates for virtual objects is a major problem that has not been adequately addressed in the field of AR. The lack of precision results in digital models drifting across the user's device as the background or physical world images change, in AR objects jumping out of position, and/or in AR objects or digital models appearing in an unexpected locale or position in the displayed real world. Within the AR field, there is also a need to quickly and accurately update the AR graphics in response to a user's change in position (or, more accurately, a change in the position and/or orientation of the viewing device) to yield an augmented display output providing an accurate and seamless AR experience.

Varied approaches have been tried in the AR industry to try to address these problems, with two approaches dominating: location-based AR through the use of a Global Positioning System (GPS) and the use of targets or markers (e.g., high-contrast objects). In location-based AR on a mobile device, the on-board GPS provides a location that is correlated with the digital data being viewed in AR. Problems are encountered because the GPS location provided by the mobile device is often inaccurate and not of the precision necessary for precise viewing in a real time AR system. Many mobile devices lack true GPS, and coordinates are provided by triangulation from Wi-Fi and cellular towers.

A second approach to address the problem of inaccurate location in AR systems is the use of high-contrast markers. High-contrast markers or objects generally have regions that can be easily distinguished by a computer system in colors such as black and white, red and green, or some other color combination of colors that can be easily distinguished from each other by a computer system. In such an AR system, markers are introduced into the physical environment to aid the hardware and software operating on mobile devices or mobile viewing devices in performing object tracking and registration. Marker technology includes use of fiducial markers that have been encoded with data, with better known technologies including use of bar codes (one dimensional (1D) or two dimensional (2D)) or quick response (QR) code technology. Information is encoded into these markers, such as for commercial tracking by the United States Postal Service and the like, and decoded by light scanners (e.g., for 1D barcodes) or charge-coupled devices (e.g., for 2D barcodes and QR codes). Further, markers in AR have been used to convey a position of the marker in relation to the camera or viewing device. In many of these approaches, a digital image or AR object is associated with the marker and, in the resulting AR system, a virtual object is projected on or near the marker. While each of these approaches provides some advances or advantages, the AR experience is not as seamless as desired with problems in using markers remaining in a typical AR system (e.g., a viewing device with AR software or the like).

The foregoing examples of the related art and limitations related therewith are intended to be illustrative and not exclusive. Other limitations of the related art will become apparent to those of skill in the art upon a reading of the specification and a study of the drawings.

SUMMARY

The present invention has been made in consideration of the above-discussed AR processes and ongoing problems. One exemplary goal that produced this invention was to have an accurate real time augmented reality (AR) system that is not dependent on a single marker technology. Another goal or objective addressed by the invention is to incorporate the benefits of geo-location into the real time AR without utilizing a Global Positioning System (GPS) or similar technology.

In order for AR systems to be accurately positioned relative to a physical world viewed via a viewing device in real time, the inventors recognized that a need exists for markers within a marker-based AR system that have the following characteristics: (1) contain real world geographic coordinate data, which is readable in any geospatial projection system (e.g., latitude/longitude, Universal Transverse Mercator (UTM) coordinate, World Geodetic System (WGS) 84, and the like); (2) be unrestricted in regards to marker type; (3) have one or more associated methods available for encoding geographic data onto the markers; and (4) have one or more associated methods for updating the AR system in real time to render an accurate experience (e.g., a seamless AR display of accurately positioned virtual objects in a displayed physical environment/scene targeted by the viewing device or its camera). The digitally encoded marker-based AR system and method described herein provides one or more of these characteristics in each described embodiment.

More particularly, the following describes a system and a method for accurately registering real world (or physical world) coordinates to the relative coordinates of an AR system (e.g., a virtual object to a corresponding physical world location). For example, the method involves encoding data in the form of geographic world coordinates and optional metadata onto high-contrast markers, which may be labeled "Digitally Encoded Markers" or DEMs. The method may use a utility ("the Digitally Encoded Marker Utility") running on a mobile device or a viewing device to extract the metadata of at least one DEM. Then, the method may include registering the geographic world coordinates on the DEM to the relative coordinates in the AR system to accurately superimpose digital data onto the real world to produce an AR experience viewable by a user in real time.

According to one aspect of the invention, a method is provided for encoding geospatial data onto a high-contrast marker. The method includes: (a) entering the coordinate data, which may be provided by a plurality of techniques including, but not limited to, a user manually entering coordinates into a computer program capable of generating a DEM, the user selecting a location from a digital map or another projection of the Earth (such as Google Earth) either on a personal computer, a mobile device, or the like, and the user entering geographic information (such as a street address, a postal code, or a city); (b) optionally, a user entering metadata that can include orientation data, a digital object ID, marker size, and the like; (c) creating text representations of the data; (d) generating a marker by an application (e.g., a third-party application or the like); and (e) generating an AR image with a plurality of output to be selected by the user including, but not limited to, QR code or a barcode (1D or 2D).

In some implementations, a DEM is a barcode (1D or 2D), is a QR code that is printed on any material including paper, paper to be affixed to another object, or metal, or is a 3D printed marker. In another embodiment, though, the DEM is digital and is displayed on a digital screen, e.g., a computer screen, a display screen of a mobile phone or tablet device, digital paper, or a display with electronic ink. An electronic-format DEM also may include projected markers in holographic nature and/or with three dimensions, in or using electronic paper arrayed in three dimensions, and in stereoscopic displays (e.g., 3D digital displays). In some cases, the DEMs may be provided for any high-contrast object. Such objects may be square or rectangular shapes but may also be circular, ovoid, or more irregular in shape. In other cases, the DEMs or markers are a combination of colors including black-and-white and color.

In some useful embodiments, the method and system may be configured such that the DEMs include additional metadata. This additional metadata may include orientation information, marker size, physical distance, relative coordinate data, 3D object data, digital object ID coordinates to which real world coordinates may be associated, and the like. In other cases, the metadata may contain an object identifier to which the real world coordinates of a 3D object are applicable. The DEMs may also be configured or used to serve as an external cue to an AR system with metadata including scaling information on how a digital 3D object is to be displayed.

In one particular embodiment, a method is provided for decoding a DEM such as with use of a DEM utility. The DEM utility may perform the following functions or steps: detecting the presence of a DEM; identifying which type of DEM matches the detected DEM; sending the DEM to the correct type of software or DEM utility routine/program for decoding; ensuring the DEM has a header identifying it correctly as a DEM; processing world coordinates; converting the determined world coordinates into AR coordinates; and matching virtual data to the real world in real time using these AR coordinates.

In a further embodiment, a system for a DEM-based AR system is provided, which includes: one or more DEMs, each containing world geographic coordinate data; a user device (or viewing device such as a mobile device) with a camera for capturing video images of the physical world or environment visible to the camera; a processor coupled to the camera; memory or data storage managed by the processor; software modules or code executable by the processor to generate, analyze, identify, and decode the DEMs; and software modules or code to generate final AR images. In some cases, the system includes a head-mounted display to provide an overlay of AR information.

In some implementations of the system (or method), the DEM contains data to orient the AR system based on the position of the marker. The system utilizes areas of the marker itself as control points, with methods of such use varying with marker type. In other implementations, the DEM contains 0,0 as the coordinates to send to the AR system. Then, the DEM-based AR system places the DEM at the center of the system. In still other implementations, the DEM-based AR system uses optional metadata from multiple digital models that are not geographically close so that these models/virtual objects appear to be close within the AR system.

In another embodiment, a method is provided for translating world coordinates to AR system coordinates. The method includes calculating the mathematical offset between the world coordinates provided by the DEM and the world coordinates of the digital data. The digital data is transformed based on the mathematical offsets so that it can be output to the AR image generator.

In yet another embodiment, a hybrid of DEM and markerless geo-location-based techniques is contemplated for use by the inventors.

In still another embodiment, a DEM is dynamically generated and updated in real time using geo-location information. The geo-location information may be provided by another device capable of providing or generating more accurate geo-location. For example, this other device may be a standalone GPS system or a differential GPS network.

In addition to the exemplary aspects and embodiments described above, further aspects and embodiments will become apparent by reference to the drawings and by study of the following descriptions.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

DESCRIPTION

Briefly, a Digitally Encoded Marker (DEM) augmented reality (AR) system of the various embodiments described herein provides or yields an accurate device location. The DEM-based AR system achieves this functionality without the need for traditional geo-location or marker techniques. Furthermore, accuracy is increased with the DEM-based AR system via use of a geo-located marker. The DEM-based AR system (and method) is operable to provide real time augmentation of reality such as augmentation of video images being captured with a video camera on a user's mobile device such as smart phone or tablet.

With use of the DEM-based AR system, greatly improved location accuracy is provided for blending virtual objects with the real world (e.g., virtual object images with images of objects in the video of the real world). As an overview, the DEM-based AR system includes components (hardware and software) for incorporating encoded markers with a geographic coordinate system, for generating augmented data from encoded markers, for authoring and encoding data onto a DEM (or, more simply, a "marker"), and for superimposing virtual data or images at a position corresponding to the marker within the real world.

Figure 1:
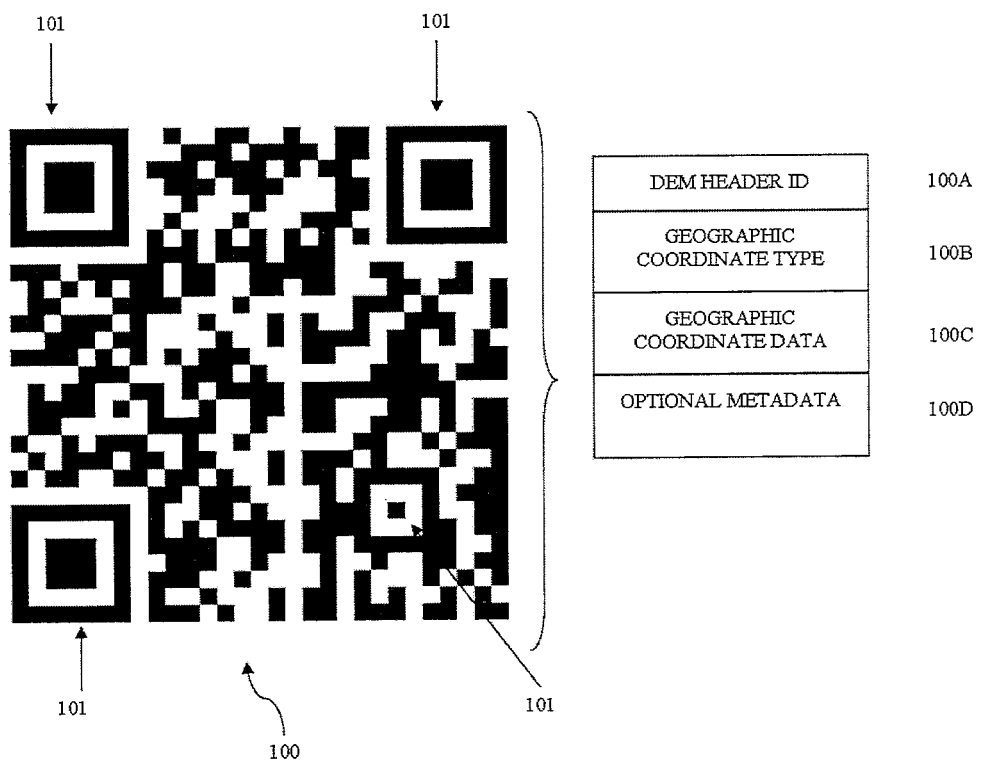
FIG. 1 illustrates an exemplary embodiment of a Digitally Encoded Marker (DEM) that may be used in the methods and systems described herein, along with a schematic illustrating a set of metadata that may be encoded on the DEM.

FIG. 1 illustrates a DEM 100 using or including QR code. The DEM 100 further includes a number of control points 101 (such as 3, 4, or more (with 4 shown as a useful number in many cases)) for orientation, e.g., for later processing of an image of the DEM to determine its orientation and for displaying a virtual object based on such determined DEM physical orientation in a real world image. The DEM 100 is provided with high-contrast to ease visual recognition and processing.

Further, the DEM 100 is digitally encoded with metadata useful in providing an enhanced AR experience. The content or types of metadata are shown schematically in FIG. 1 to include: (a) a DEM header identifier 100A (for example, the text "DEMU" followed by a separator such as a semi-colon); (b) a geographic coordinate type 100B, which identifies the world geographic coordinate system associated with the DEM 100 (for example, the text "LL" to indicate latitude and longitude coordinates or the text "UTM" to indicate UTM coordinate data, followed by a separator such as a semi-colon); (c) the world geographic coordinate data 100C for the DEM 100, in the format specified by metadata 100B; and (d) optional additional metadata 100D such as orientation data, physical marker size, and the like. A full description is provided below with reference to FIG. 2 as to how the metadata 100A-100D are encoded and stored.

The DEM 100 of FIG. 1 may be implemented in black and white. However, it should be noted that the DEM 100 may take many other forms and formats to provide a high-contrast design. For example, the DEM 100 may include or be provided with one or more colors (other than or in addition to black and white), with shading, with a barcode, and with other patterns such as a 3D pattern/design, an irregular pattern, and the like. Additionally, the DEM 100 is shown to be rectangular (i.e., a square shape), but the size and shape may be varied from the configuration shown, with shape and size not being limiting to the DEM 100.

Figure 2:
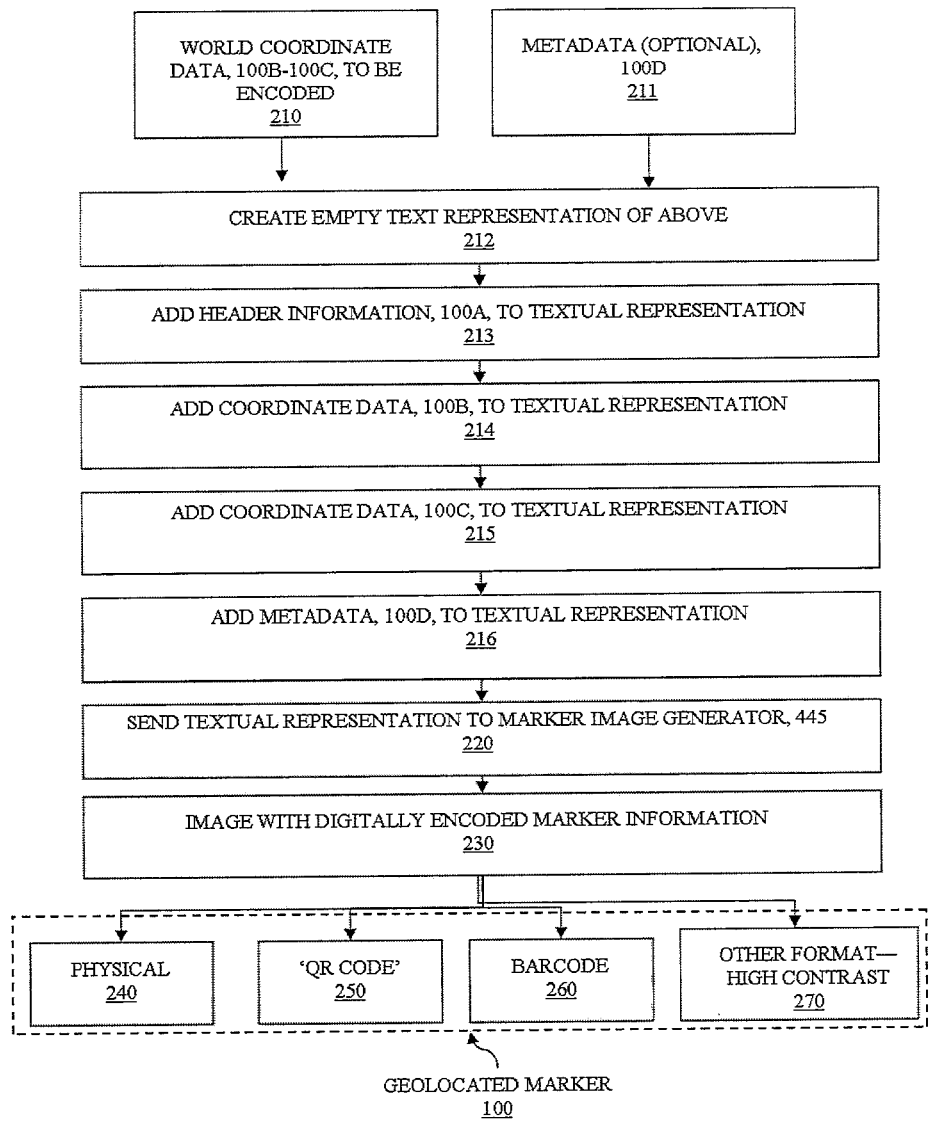
FIG. 2 is a flow diagram of an illustrative embodiment of a method for generating and storing marker data and/or creating DEMs.

FIG. 2 illustrates a method for encoding the metadata 100A-100D onto a marker such as DEM 100. The method may be implemented by a computer with a processor running a program or application adapted to perform the illustrated steps/functions. At 210, the world coordinate data 100C and the type of this data 100B are input by a user or operator by any of a variety of input mechanisms (e.g., keyboard, mouse, touchscreen, and so on) and stored, at least temporarily, in memory/data storage. The optional additional metadata 100D may also be provided at 211 by an operator or user of the computing device performing the method of FIG. 2.

At 212, the method continues with creating and storing an empty text representation for the DEM 100. At 213, the method includes appending a DEM header 100A to the text representation, with the revised representation again stored in memory. Then, at 214, the representation in memory is modified with the previously-received coordinate data type 100B being appended to the text representation. At 215, the method continues with appending the coordinate data 100C to the text representation, and, then at 216, if present in memory, appending the additional metadata 100D to the text representation.

At 220, the text representation stored in memory in step 216 is then sent to or transferred to a marker image generator (e.g., generator 445 on user device 400, which may take the form of a commercially-available software package with the particular implementation not being limiting to the invention and which may be used as shown in device 905 for generating/displaying a DEM 100). At 230, the marker image generator, running on the same or a different computer, processes the text representation so as to generate or produce an image (e.g., a geo-located marker or DEM 100) with digitally encoded marker information. The image provided at 230 of the method of FIG. 2 may take a variety of forms to provide a useful DEM. For example, the image may be a physical image 240, a QR code 250 (such as shown with DEM 100 of FIG. 1), a barcode 260, or some other format providing high contrast 270 (including a digital format). While the method of FIG. 2 encodes the metadata 100A-

100D in a textual representation, other representations may be used such as a binary representation of the user-provided input for each portion or set of metadata for a marker. The control points 101 are created by the marker image generator 445 and will be dependent on the type of image generated.

Figure 3:
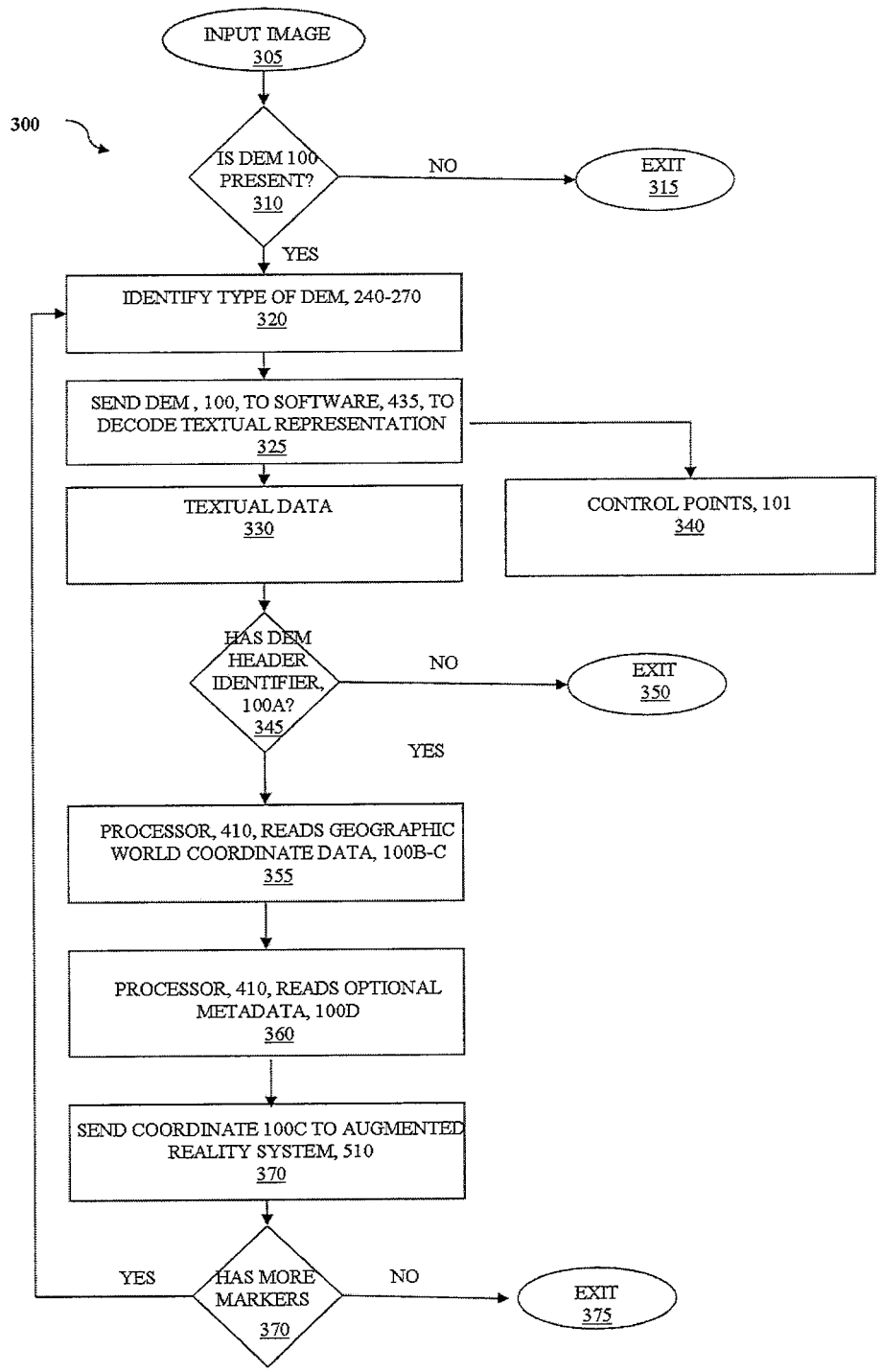
FIG. 3 is a flow diagram of an illustrative embodiment of a method for decoding marker data stored on a DEM (such as the DEM of FIG. 1) into an AR system.

FIG. 3 illustrates a method 300 for decoding data from an input image, e.g., the method 300 starts at 305 with input of a digital image, e.g., a video image captured by a camera of a viewing or user device (such as a video camera of a smart phone or the like). For example, a user device such as device 400 may have viewing hardware such as camera 405 that is operated by the user to capture videos input at step 305. The method 300 may be used to decode the data from the input image into an AR system such as system 510 of FIG. 5, and the method 300 may be carried out by a utility or software application (shown as DEM decoder utility 435 in FIG. 4) run by a processor on a viewing or user device (shown as AR user device 400 in FIG. 4). The DEM decoder utility performs method 400 to extract metadata of a marker such as metadata 100A-100D of DEM 100.

In the method 300, at 310, a marker analyzer (shown as module 430 in user device 400) processes the input image from step 305 to determine whether a marker (such as DEM 100) is present in the input image. If not, the method 300 ends or exits at 315. If a marker is identified at 310, the method 300 continues at 320 with identifying the type of marker present in the input image. The specific details of how detecting is performed may vary with differing software/marker analyzers but will generally include converting the input image to grayscale, thresholding the image to find light and dark areas, and performing pattern matching to find the marker. Such detecting is known by those skilled in the art with software performing such detecting being commercially available, and further description is not required to understand the method 300.

In step 320 (performed when a DEM is detected), the method 300 involves identifying the type of the DEM (e.g., one of types 240-270 shown in FIG. 2). Each type of marker may have a marker analyzer (software program run by processor 410 on user device 400) capable of processing a specific marker type or a software package capable of processing multiple marker types may be utilized. With the type identified, the method 300 continues at 325 with the marker (e.g., DEM 100) being sent to an appropriate marker analyzer (e.g., the analyzer matching the marker type identified in step 320). At 330, the marker analyzer outputs/returns a textual representation of the DEM as well as, at 340, any control points present in the DEM (e.g., a textual representation of the DEM 100 with control points 101).

At 345, the method 300 continues with the processor 410 examining the textual representation for a header (e.g., DEM header ID 100A). If this header is not present, the method 300 ends or exits at 350. If the header is present at 345, the method 300 continues at 355 with the processor 410 reading the geographic coordinate data type (e.g., metadata 100B in DEM 100) and the geographic coordinate data (e.g., metadata 100C in DEM 100). Next, at 360, the processor 410 reads any additional metadata (e.g., metadata 100D), if present in the textual representation of the marker.

The method 300 continues at 370 with the decoded geographic coordinate data (e.g., data 100C of DEM 100) being sent to the AR system (e.g., system 510 in FIG. 5) to be used for the user location. The method 300 then continues at 375 with checking whether another marker (e.g., another marker such as DEM 100) is present in the input image. If so, the method 300 continues at 320 to decode the additional marker. If no additional markers are present in the input video image, the method 300 exits or ends at 375. Note, size is not a limiting factor in decoding and identification of a particular marker such as the size of DEM 100.

Figure 4:
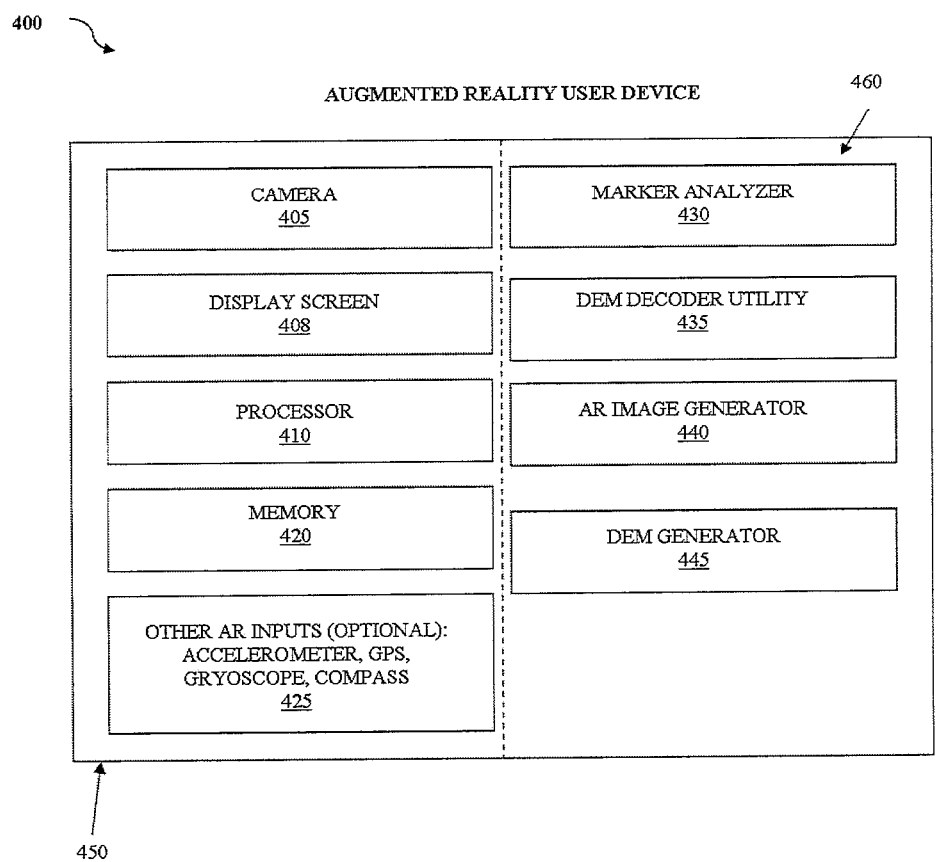
FIG. 4 is a functional block or schematic diagram of a viewing or user device configured for implementing a DEM-based AR method described herein such as the methods of FIGS. 2 and 3 such as for use within an AR system.

FIG. 4 illustrates one design or useful embodiment for an AR user device (or viewing device) 400. As shown, the AR user device 400 includes hardware 450 and software 460 that are used in combination in an AR system capable of decoding a marker such as DEM 100. Processor or CPU 410 directs or runs software 460 and manages memory 420 and input components 425 (which are optional in some embodiments). The processor 410 also communicates with a video camera 405 to receive input images of a real world or physical environment near (or "targeted") by the device 400 (e.g., during use of the AR user device 400 by a user/operator (not shown)).

The memory 420 of the device 400 may be used to hold or store data obtained from the video camera 405. This camera input may include an input image provided to method 300 at step 305, a text representation of a DEM as generated in method 300 at step 330, and other data for the correct operation of the user device 400. During operation of the device 400, the camera 405 generates input images (input at step 305) for the DEM decoder utility 435 (which performs steps of method 300 of FIG. 3). The DEM decoder utility 435 may utilize marker analyzer or processors and/or marker processing libraries 430 (which may be commercially available) for analyzing (e.g., performing steps 320 and 325 of method 300) the input image (e.g., provided by video camera 405 at step 305 of method 300). The DEM decoder utility 435 produces DEM control points (points 101 in DEM 100 of FIG. 1) and a textual representation of the marker being processed in the camera-provided image (e.g., textual data output at step 330).

The DEM decoder utility 435 also produces or identifies the final geographic coordinates (e.g., metadata 100C of DEM 100 of FIG. 1), and these coordinates are output to an AR system application (such as AR system module 510 shown in FIG. 5), which will process the geometry in the AR system (i.e., the AR experience to be provided in the display of the user device 400). The AR image generator 440 generates the final image that overlays the digital information (providing one or more virtual objects that are accurately located and oriented) onto the input image from video camera 405 so as to produce a final image (such as image 710 shown in FIG. 7) that is displayed to the user on display device or screen 408 by processor 410. The user device 400 may also contain a DEM generator 445 that is capable of performing the steps shown in FIG. 2 to create a DEM (such as DEM 100 of FIG. 1). The generated DEM may be displayed on the display device or screen 408 of the AR user device 400 for capturing as part of an input image by another one of the user devices 400.

Figure 5:
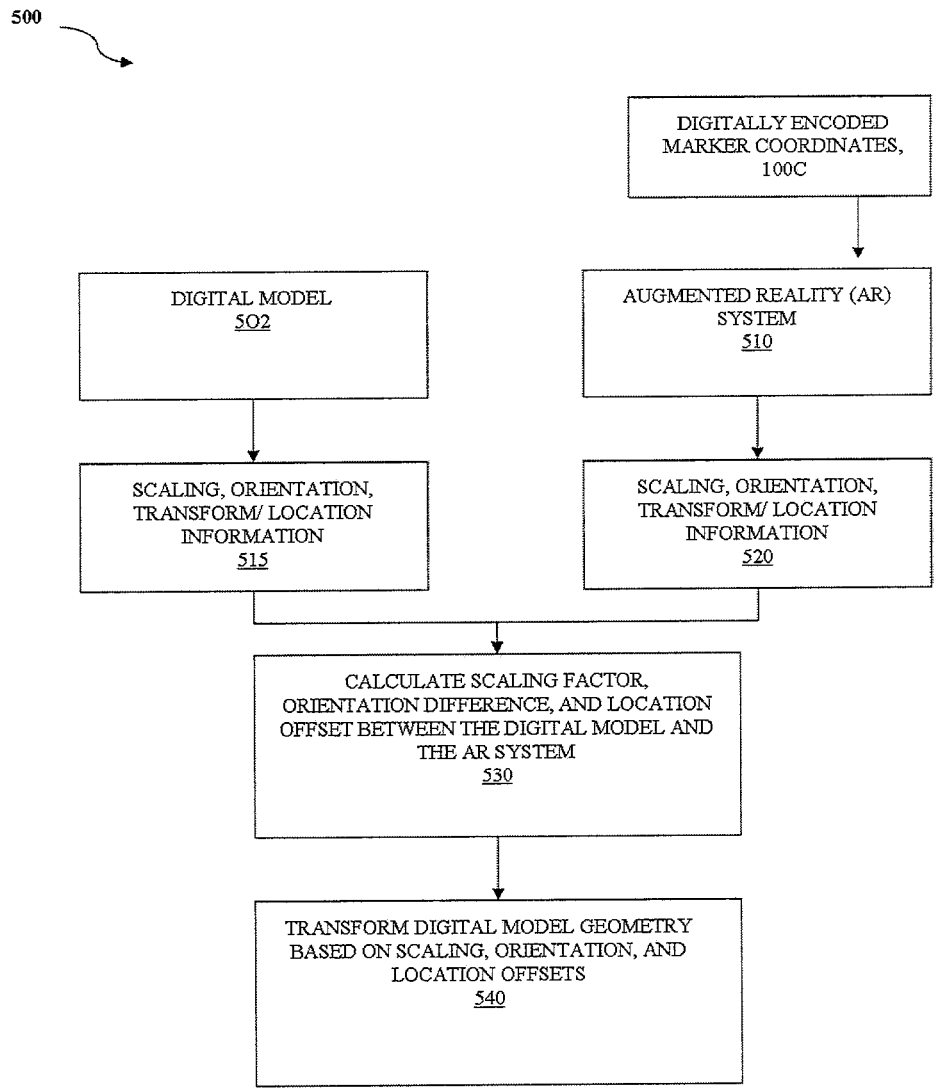
FIG. 5 is a functional block or schematic diagram providing an overview of an AR experience method using coordinates from a DEM.

FIG. 5 is an overview of a method (or data flow schematic) 500 for automatic AR-virtual model matching that may be performed during operation of a viewing device, such as AR user device 400 of FIG. 4. The matching process 500 involves automatically registering geographic coordinate data (e.g., data 100C) that is decoded from a marker (e.g., DEM 100) to relative coordinates in an AR system 510. The decoded coordinate data may be produced or obtained by performing method 300 of FIG. 3. The process 500 produces digital data 540 that is superimposed on an input image (such as the video camera input image provided at step 305 of method 300 of FIG. 3) so as to create an output image (such as image 710 shown in FIGS. 7 and 8 that is displayed on a viewing device's screen or monitor). Note, the term "digital model" is intended to mean any digital data that may be displayed to provide an AR output image and is not limited to the 3D model or image shown in FIG. 8. For example, the digital model 502 may be any type of data such as a picture, text, and the like which may have geo-encoded information.

Figure 8:
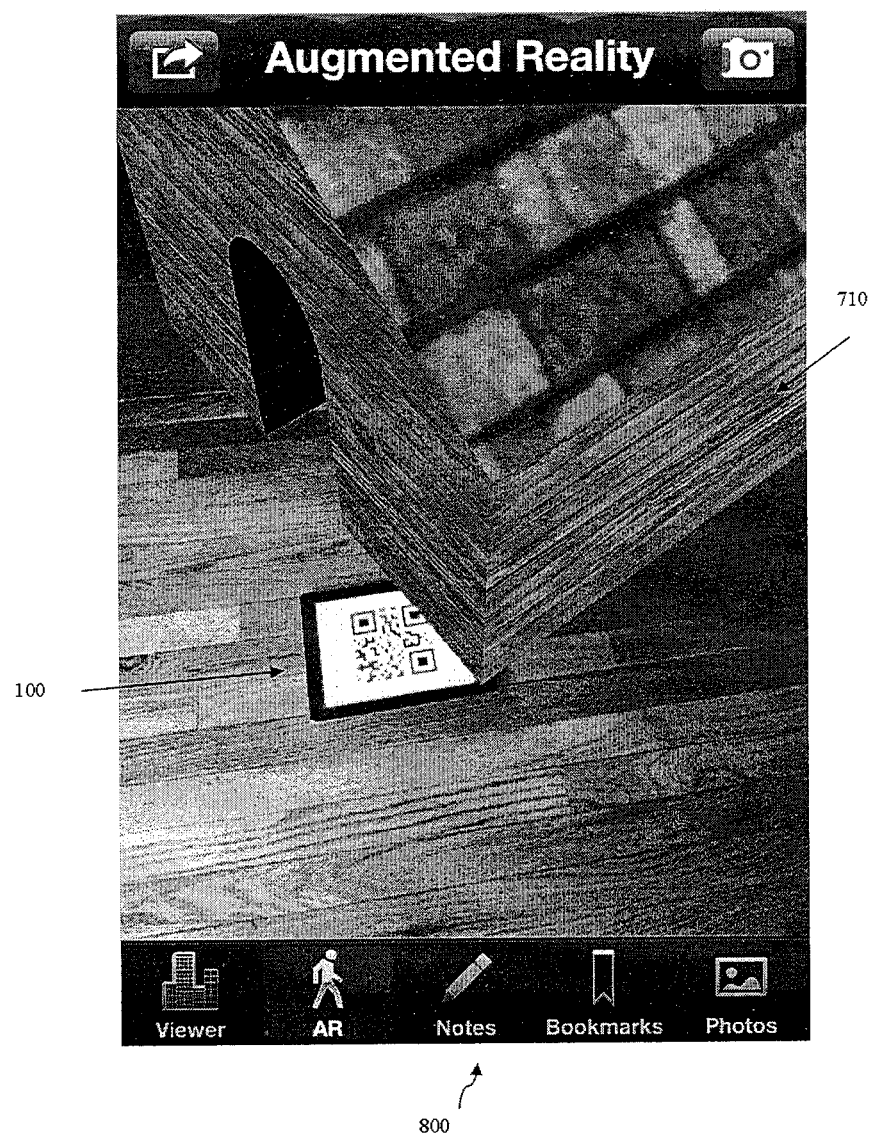
FIG. 8 is a screenshot example as would be shown to a user/viewer on a screen of their viewing/user device, as may be provided via a mobile application employing the DEM-based AR system.

To this end, the process 500 includes analyzing the input digital data 502 that is to be overlaid on input images (real world images), e.g., the data 502 may provide a virtual object(s) (with a dog house being shown as an example in FIG. 8). This processing involves identifying any scaling, orientation, transformation, and location information in the digital model 502 (both of which may be stored in memory) as shown at 515 in FIG. 5. The method 500 also includes analyzing the DEM geographic coordinates (data 100C in FIG. 1 for DEM 100) and outputting them to the AR system 510 so as to produce final scaling, orientation, transformation, and location information shown at 520 (and as may be stored in memory).

The method 500 further includes calculating the scaling factor, an orientation difference, and location offset (as shown at 530, which may be stored in memory) between the digital model 502 and the AR system 510. As shown at 540, the method 500 further includes transforming the digital data geometry based on the scaling, orientation, and location offsets.

Figure 6:
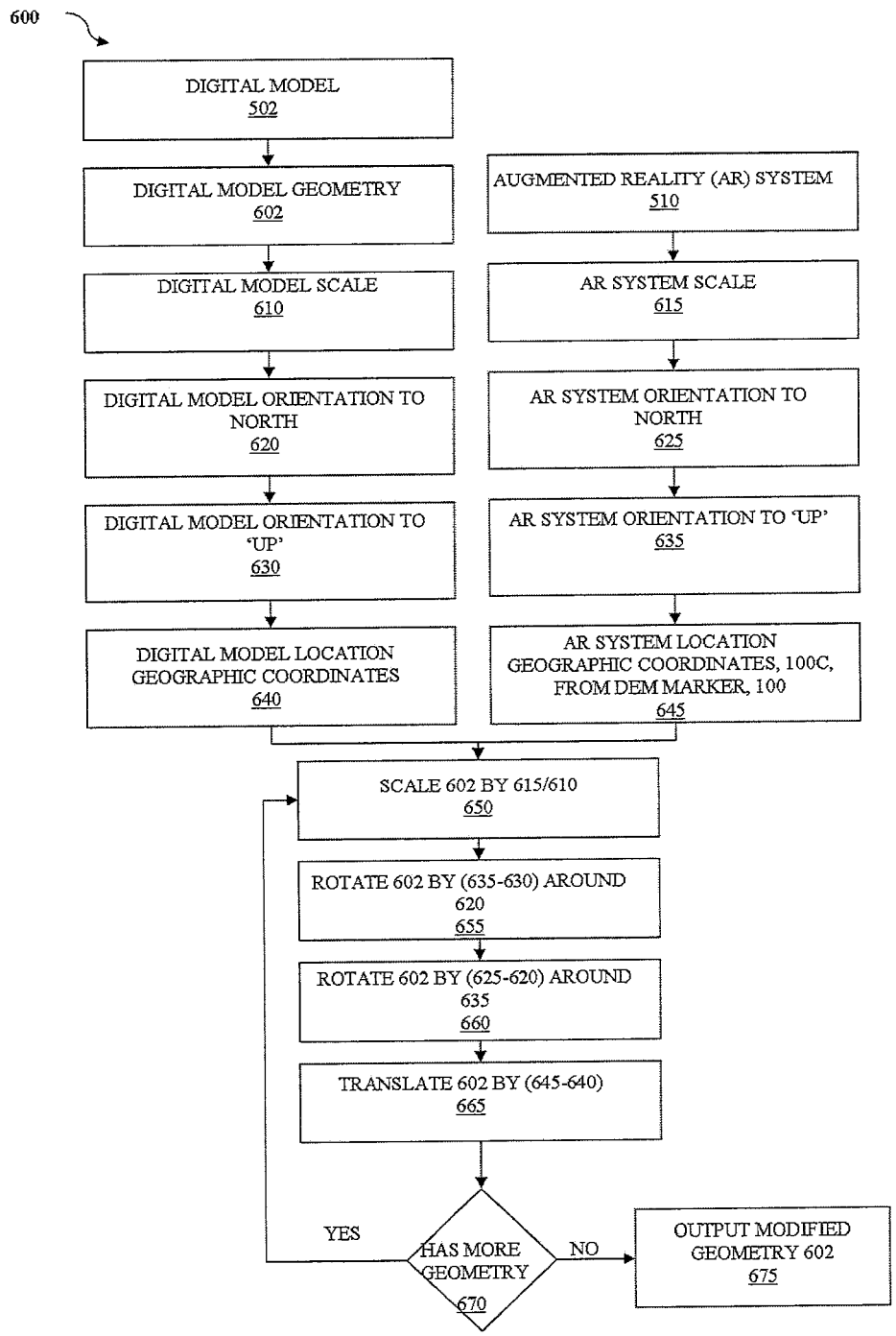
FIG. 6 is a detailed diagram of flow of data and mathematical operations on data in an AR system useful for transforming coordinate from a DEM to the internal coordinates of an AR system.

FIG. 6 illustrates a method 600 for performing the translation, orientation, and scaling as may be performed during or as part of the data processing and creation shown in FIG. 5. The digital data or model 502 is processed to determine: geometry 602; scaling information 610; orientation to north (or other orienting direction) 620; orientation to "up" (or an axis transverse to a horizontal plane) 630; and geographic location coordinates 640. Likewise, the AR system data or definition 510 may be processed to determine the following set of data/information: system scaling information 615; orientation to north 625; orientation to "up" 635; and geographic location coordinates 645 (coordinate data 100C obtained from a DEM 100).

At 650, the method 600 includes scaling the digital model geometry 602 by the AR system scale 615 divided by the digital model scale 610. At 655, the method 600 includes rotating the digital model geometry 602 by the AR system orientation to "up" minus or less the digital model orientation to "up" 630. Further, at 660, the method 600 includes rotating the digital model geometry 602 by the AR system orientation to north 625 minus the digital model orientation to north 620 around the AR system orientation to "up" 635.

Then, at 665, the method 600 includes translating the digital model geometry 602 by the amount of the geographic location coordinates (metadata 100C of DEM 100) minus the digital model geographic coordinates 640. At 670, the method 600 includes determining whether more model geometry 602 has to be processed. If so, the method 600 continues at 650. If not, the modified geometry for the digital model 502 is output for use in creating a final image (e.g., an AR experience/display via a viewing or user device).

A non-limiting example of the data used in method 500 and method 600 will now be given. The AR system scale 615 may be, for example, 'meters', and the digital model scale 610 may be 'inches'. Since there are 39.37 inches in a meter, the scaling factor computed in 650 will be 1.0 divided by 39.37, which is 0.0254. The AR system orientation to north 625 may be obtained from an on-board compass or digital magnetometer 425 and be, for example, 125 degrees clockwise from north. The digital model orientation to north 620 may be fixed at 0 degrees clockwise from north. The scaling factor computed in 655 would be 125 minus 0, which is 125 degrees. The digital model geometry 620 would have to be rotated 125 degrees to now be aligned with the AR system.

The AR system orientation to up 635 may be obtained from an on-board accelerometer 425 and be, for example, 45 degrees forward and 12 degrees to the right. The digital model orientation to up 630 may be fixed at 0 degrees forward and 0 degrees to the right. The scaling factor computed in 660 would be 45 degrees forward and 12 degrees to the right. The digital model geometry 620 would have to be rotated 45 degrees forward and 12 degrees to the right to be aligned with the AR system. Finally, the AR system location 645 may be, for example, 1,000 m North and 2,000 m East. The digital model location 640 may be, for example, 1,050 m North and 2,020 m East. The scaling factor computed in 665 would then be −50 m North (or 50 m South) and −20 m East (or 20 m West). The digital model geometry 620 would have to be moved 50 m South and 20 m West to be aligned with the AR system.

This description is intended to provide the reader a simplistic example of the data used in the calculations of method 500 and 600. The exact calculations, especially the ones involving angles, will generally be more advanced consisting of vector calculus, quaternions, rotation matrices, or some other suitable mechanism that may be dependent on the implementation of the model geometry and the AR system.

Figure 7:
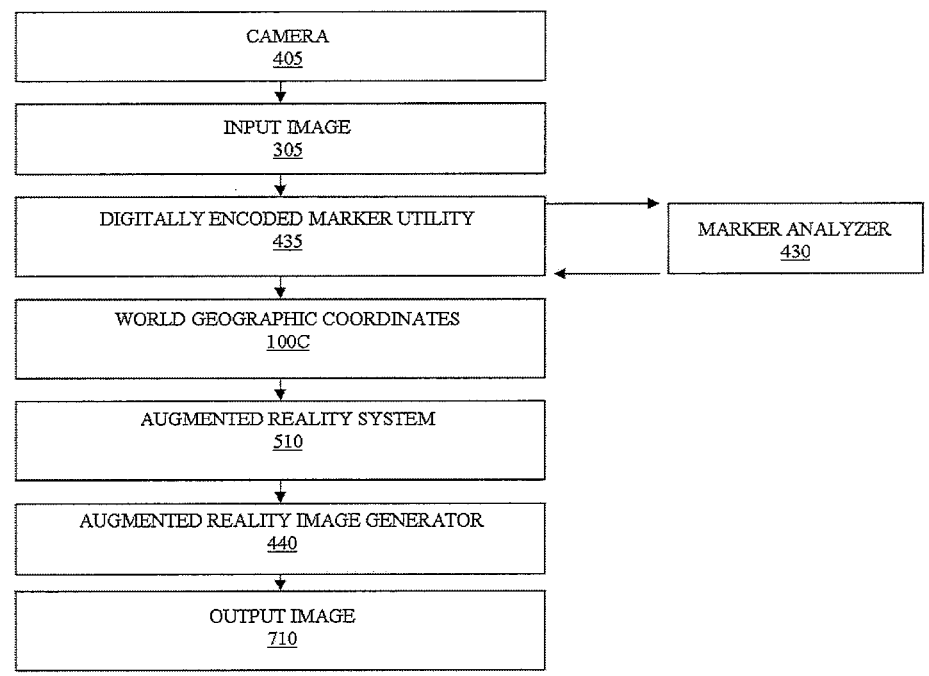
FIG. 7 is a functional block or schematic showing an overview of an AR method or process from image acquisition by a camera of a viewing/user device to display of a final AR image to a user of the viewing/user device.

FIG. 7 illustrates, with a functional block diagram, an overview of an entire system 700 for providing an improved AR experience as described herein. As shown, the system 700 acts to acquire an input image (video image of a physical scene or environment) 305 with a video camera 405 and to generate an output image 710 that is displayed to a user via a display screen or monitor (e.g., a display screen of the user device containing the camera 405 or a separate display device).

In operation of the system 700, the device camera 405 acquires an input image 305 and outputs it to the DEM decoder utility 435. The DEM decoder utility 435 works with a marker analyzer software module(s) 430 to decode one or more DEM 100 in the input image 305 and also to read the geographic coordinates 100C from the metadata of the DEM 100. The geographic coordinates 100C are output to the AR system 510 that transforms the digital model geometry 602 to produce the final geometry 675.

The final digital model geometry 675 is combined with the input image 305 from the video camera 405 by the AR image generator 440 to produce a final output image 710. This image 710 can be displayed to the user via a monitor (e.g., a display screen on their user or viewing device), recorded to a video stream, saved as an individual image, or processed/used with any other operation the user decided to perform on the final output image 710.

Figure 9:
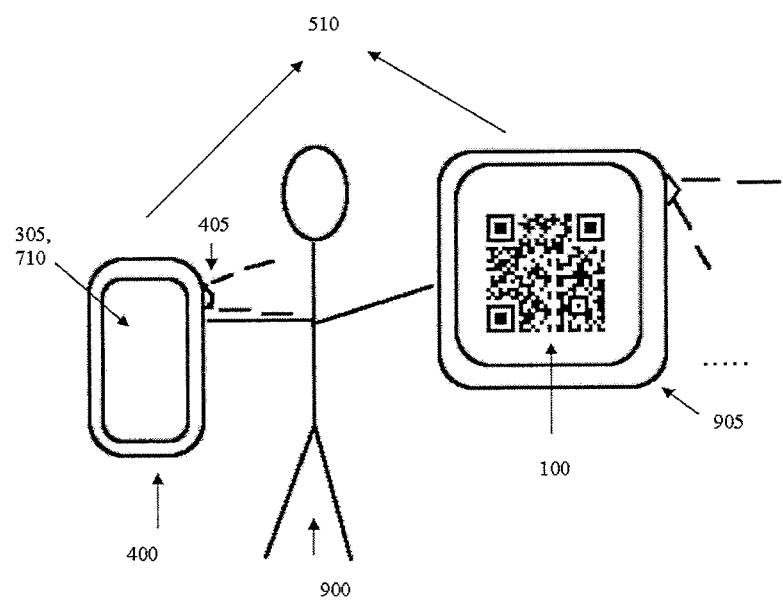
FIG. 9 illustrates with a functional block or schematic diagram one embodiment of a DEM-based AR system.

FIG. 8 illustrates a screen shot 800 of a display screen of a user device 400 during use as shown in FIG. 9. FIGS. 8 and 9 provide an example of a mobile real-time interactive AR using DEMs such as exemplary DEM 100. A user 900 may place digital content or a virtual object (e.g., digital model 502) onto their AR user device or viewing device 400. In this example, the digital model 502 is a 3D model of a dog house, but, as discussed above, the digital model may be a picture, text, or nearly any digital data useful for augmenting an input image captured by a user device 400. The screenshot 800 may be presented by an AR mobile application running on a user device 400, and the AR experience provided by screenshot 800 is provided utilizing a digital DEM 100 from a tablet 905 to provide geo-location of digital content or 3D model 502 in a physical location where the user 900 has placed the tablet 905 and imaged it with a camera 405 on device 400.

The example screenshot 800 may be from a smart phone or similar device and displays the final augmented image 710, which may be produced by method 700. FIG. 9 shows one example of a DEM-based AR system 510, which may be provided by a user device 400 with the software and hardware described herein and one or more DEMs 100 (printed or otherwise provided on a physical item or displayed as shown in FIG. 9). User 900 holds the AR user device 400 and operates camera 405 to acquire input image 305. The input image 305 includes images of the real world/physical scene or environment near the user.

Further, the user 900 operates a tablet or second user device 905 to present/display DEM 100. The camera 405 may be targeted or focused so as to capture the DEM 100 within the input image 305 of the real world. The AR system 510 may use a plurality of DEMs 100 rather than the one DEM 100 shown in FIG. 9. Utilizing a second digital device 905 enables the user 900 to create a DEM 100 with geographic coordinates 100C on the fly while mobile and quickly incorporate real world accuracy into the AR system 510 as the virtual object 710 is displayed as an overlaid image on the real world/input image 305 based on the positioning of the DEM within the real world environment captured by the camera 405.

Figure 10:
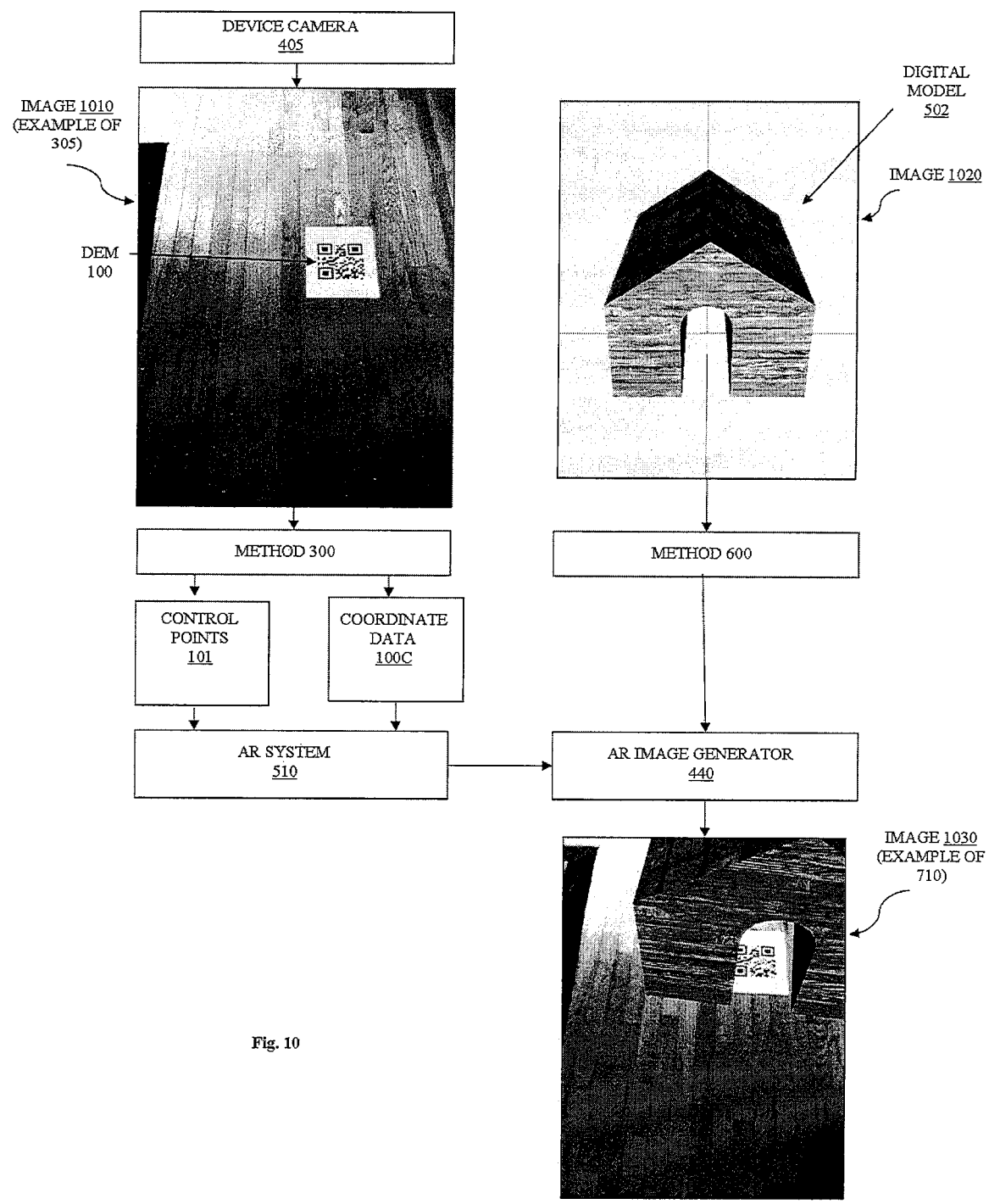
FIG. 10 illustrates an output image of an AR system/method described herein providing an example of an input image being combined with a model to produce the output image.

FIG. 10 is a non-limiting example of how the AR experience is provided or implemented with the components or system elements discussed above. The device camera 405 provides an image 1010, which is an example of input image 305 containing a DEM 100. After performing method 300, the control points 101 and coordinate data 100C are sent to the AR system 510. Image 1020 is an example image containing a digital model 502 or of what may be provided as digital data for augmenting the input image 1010 at or based on the location of DEM 100. After performing method 600, the AR image generator 440 produces image 1030 which is an example of output image 710.

Figure 11:
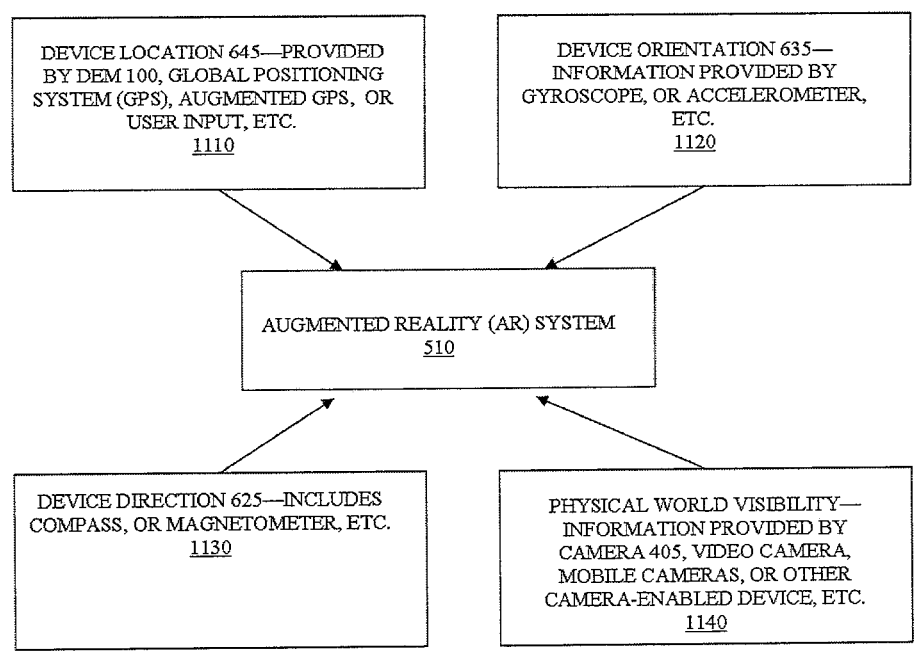
FIG. 11 is a functional block illustration or schematic of exemplary components of an AR system.

FIG. 11 is useful for providing further description of the components of the augmented reality system 510. The AR system 510 collects information from device hardware 450 about the location 645, orientation 635, direction 625, and real world 305 around the device. The AR system input 1110 is device location information 645, which can be provided by a DEM 100, GPS systems, or by user input. The AR system input 1120 is device orientation information 635, which can be provided by gyroscopes, accelerometers, or the like. The AR system input 1130 is device direction information 625 which can be provided by device compass or magnetometer. The AR system input 1140 is physical world visibility such as input image 305 provided by device camera 405.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include modifications, permutations, additions, and sub-combinations to the exemplary aspects and embodiments discussed above as are within their true spirit and scope.

The invention claimed is:

1. A method of providing an augmented reality experience with a user device, comprising:

receiving an input image of a physical environment from a camera included in or on the user device, wherein a digitally encoded marker (DEM) is positioned at a marker location within the physical environment;

decoding data from the DEM by processing the input image, wherein the decoded data comprises at least one of geographic coordinate data and relative coordinate data;

retrieving digital content for a virtual object; and displaying an augmented reality image, on a display screen of the user device, including the input image and an overlay image representing the virtual object positioned within the augmented reality image based on the decoded data from the DEM and the marker location, wherein the overlay image is positioned within the augmented reality image using the at least one of the geographic coordinate data and the relative coordinate data decoded from the DEM.

2. The method of claim 1, wherein the relative coordinate data is decoded without calculating coordinates of the DEM in the physical environment, and wherein the displaying further comprises registering the at least one of geographic coordinate data and the relative coordinate data, decoded from the DEM, to relative coordinates in the augmented reality image.

3. The method of claim 1, wherein the decoded data includes orientation data orienting the overlay image within the augmented reality image based on the marker position and an orientation of the DEM within the physical environment.

4. The method of claim 1, wherein the decoding data from the DEM comprises preparing a textual representation of the DEM.

5. The method of claim 1, wherein the decoding data from the DEM comprises identifying two or more control points for use in the positioning of the overlay image in the augmented reality image.

6. The method of claim 1, wherein the displaying comprises translating model geometry of the virtual object using the at least one of the geographic coordinate data and the relative coordinate data from the DEM.

7. The method of claim 1, wherein the DEM marker comprises a barcode or a quick response (QR) code.

8. The method of claim 1, wherein the displaying the augmented reality image includes transforming a digital model geometry of the virtual object based on a scaling factor, a orientation difference, and a location offset.

9. The method of claim 8, wherein calculating the scaling factor includes dividing the AR coordinate system scale by the digital model scale, calculating the orientation difference includes determining a first orientation difference by subtracting the AR system orientation in a first direction minus the digital model orientation in the first direction and determining a second orientation difference by subtracting the AR system orientation in a second direction from the digital model orientation in the second direction, and calculating the location offset includes subtracting the geographic coordinates from geographic coordinates of the digital model.

10. The method of claim 9, wherein displaying the virtual object includes scaling the digital model by the scaling factor, orienting the digital model by rotating the digital model in the first direction by the first orientation difference and the second orientation direction by a second orientation difference, and translating the digital model by the location offset.

11. A user device adapted for augmented reality (AR) experiences, comprising:

a camera operating to capture an input image including an image of a marker encoded with data;

memory storing a digital model of a virtual object;

one or more components determining a location of the user device and an orientation of the user device;

a utility extracting the data from the marker image and mapping the digital model to the input image based on the extracted data; and an AR image generator generating an AR image comprising the input image and an image of the object defined by the digital model positioned and oriented based on the mapping and on at least one of the determined user device location and the determined user device orientation, wherein the data from the marker image includes at least one of geographic coordinate data and relative coordinate data, wherein the generating of the AR image further comprises registering the at least one of geographic coordinate data and the relative coordinate data to relative coordinates in the AR image, and wherein the data from the marker image includes an object identifier and wherein the virtual object is selected based on the object identifier encoded in the marker.

12. The user device of claim 11, wherein the data from the marker image includes orientation information used by the AR image generator in the generating of the AR image.

13. The user device of claim 11, wherein the data from the marker image includes scaling information and the generating by the AR image generator comprises scaling the image of the object based on the scaling information.

14. The user device of claim 11, wherein the registering includes calculating a mathematical offset between the geographic world coordinates and coordinates provided in the digital model of the virtual object.

15. The user device of claim 11, wherein determining of the orientation of the user device includes receiving data obtained from an on-board compass or digital magnometer.

16. The user device of claim 11, wherein determining the orientation of the user device further includes receiving data from an onboard accelerometer.

17. A user device adapted for augmented reality (AR) experiences, comprising:

a camera operable to capture an input image including an image of a marker encoded with data;

a component determining a location of the user device;

a utility extracting at least a portion of the data from the marker image and mapping a digital model to the input image based on the extracted portion of the data; and an AR image generator generating an AR image comprising at least a portion of the input image and an image of the digital model positioned based on the mapping and on the determined user device location, wherein the data from the marker image includes at least one of geographic coordinate data and relative coordinate data usable by the AR image generator in the generating of the AR image, and wherein the generating of the AR image further comprises registering the at least one of geographic coordinate data and the relative coordinate data to relative coordinates in the AR image.

18. The user device of claim 17, wherein the data from the marker image includes an object identifier and wherein the digital model is selected based on the object identifier encoded in the marker.

19. The user device of claim 17, wherein the data from the marker image includes scaling information and the generating by the AR image generator comprises scaling the image of the digital model based on the scaling information.

20. The user device of claim 17, wherein the registering includes calculating a mathematical offset between the geographic world coordinates and coordinates provided in the digital model of a virtual object.

* * * * *